(12) United States Patent
Liu et al.

(10) Patent No.: US 8,871,393 B1
(45) Date of Patent: Oct. 28, 2014

(54) REGENERATIVE FUEL CELL AND HYDROGEN STORAGE SYSTEM

(75) Inventors: Ping Liu, Irvine, CA (US); John Vajo, West Hills, CA (US)

(73) Assignee: HRL Laboratories, LLC, Malibu, CA (US)

( * ) Notice: Subject to any disclaimer, the term of this patent is extended or adjusted under 35 U.S.C. 154(b) by 1144 days.

(21) Appl. No.: 12/403,783

(22) Filed: Mar. 13, 2009

(51) Int. Cl.
*H01M 8/00* (2006.01)

(52) U.S. Cl.
USPC ............ 429/400; 429/526; 429/525; 429/417; 429/502; 429/523; 429/530; 429/483; 429/492

(58) Field of Classification Search
CPC ........................................................ H01M 8/22
USPC ........................................... 429/483, 492, 526
See application file for complete search history.

(56) References Cited

U.S. PATENT DOCUMENTS

| 2004/0223907 | A1* | 11/2004 | Pez et al. ................... 423/648.1 |
| 2006/0078767 | A1* | 4/2006 | Arimura .......................... 429/20 |
| 2008/0248345 | A1* | 10/2008 | Soloveichik et al. ........... 429/17 |
| 2011/0091746 | A1* | 4/2011 | Knuckey et al. .................. 429/7 |

FOREIGN PATENT DOCUMENTS

JP          2006261034         * 9/2006

OTHER PUBLICATIONS

Kariya et al. "Direct PEM fuel cell using "organic chemical hydrides" with zero-C02 emission and low-crossover", Physical Chemistry Chemical Physics, 2006, 8, 1724-1730.*

* cited by examiner

*Primary Examiner* — Patrick Ryan
*Assistant Examiner* — Alex Usyatinsky
(74) *Attorney, Agent, or Firm* — O'Connor & Company (57) ABSTRACT

A regenerative fuel cell is provided by the present invention. In the methods and systems described herein, a source of fuel is partially oxidized to release protons and electrons, without total oxidation to carbon monoxide or carbon dioxide. The partially oxidized fuel can be regenerated, by reduction, when the fuel cell is reversed. Other variations of the invention provide a convenient system for hydrogen storage, including steps for both release and recapture of hydrogen.

22 Claims, 6 Drawing Sheets

REGENERATIVE FUEL CELL AND HYDROGEN STORAGE SYSTEM

FIELD OF THE INVENTION

The present invention generally relates to fuel cells and to methods of using fuel cells. This invention also relates to hydrogen storage systems.

BACKGROUND OF THE INVENTION

Fuel-cell systems continue to offer much theoretical promise for the production of electricity, well over 150 years after the fuel cell was discovered and first demonstrated.

Today, hydrogen/oxygen fuel cells coupled with stored hydrogen are the farthest along the path toward commercialization of fuel cells. A major obstacle is hydrogen storage. For use in transportation applications, a gravimetric hydrogen density of at least 6 weight percent (wt %) for the entire hydrogen delivery system is generally desired.

High densities can be achieved using compressed hydrogen. However, the pressures required for reasonable volume densities are in excess of 350 atmospheres. Liquid hydrogen can also be used, but the energy required for liquefaction consumes a significant amount of energy, relative to the energy content of the stored hydrogen. In addition, maintaining liquid hydrogen for extended times without significant loss is difficult.

Hydrogen can be stored chemically in metal hydrides. Transition metals and alloys have been studied extensively for hydrogen-storage applications. The number of hydrogen atoms stored per metal atom generally does not exceed two, which largely precludes transition metals from achieving densities greater than about 5 wt % (typical values are about 1-3 wt %).

Lighter elements such as those in periods (rows) 2 and 3 in the periodic table can bond with hydrogen. One example is magnesium which can store about 7.5 wt % hydrogen as magnesium hydride, $MgH_2$. However, magnesium hydride, and hydrides in general, are thermodynamically too stable, such that the hydride must be heated to excessively high temperatures to release the stored hydrogen. For example, $MgH_2$ must be heated to temperatures of about 300° C. or greater to produce practical quantities (pressures) of hydrogen at equilibrium.

Some hydride systems have favorable thermodynamic (equilibrium) properties, but typically these systems have severe kinetics (rate) constraints. For example, sodium alanate, $NaAlH_4$, stoichiometrically contains 5.6 wt % recoverable hydrogen that can be released by heating to temperatures of about 200° C., but the rate of $H_2$ release is slow. Many complete metal-hydride systems involve multiple-phase solid-solid reactions which have very slow reaction rates. Complex metal hydrides also often suffer from instability toward water.

Regenerative fuel cell systems are capable of producing power and then electrolytically regenerating their reactants using electrochemical cells. Most regenerative fuel cells utilize the hydrogen/oxygen system. During the operation of such a fuel cell known in the art, hydrogen and oxygen combine to form water and generate electricity. Water can be electrolyzed back to hydrogen and oxygen, either within the same fuel cell or in a separate electrolyzer. While the system can function reversibly, hydrogen gas needs to be stored, usually in a tank. The weight of the tank significantly reduces the actual energy density achievable.

Direct-alcohol fuel cells use alcohol (e.g., methanol or ethanol) that is not reformed into hydrogen, but rather is fed directly into a fuel cell. Electrochemical oxidation of the alcohols, at the anode of the fuel cell provided by the prior art, leads to the formation of carbon dioxide. Practically speaking, such total oxidation to $CO_2$ is an irreversible reaction. This irreversibility causes the continuous consumption of alcohol which therefore must be continuously provided to the fuel cell.

In view of these shortcomings associated with the prior art, what is needed is a fuel cell system that does not require costly means for hydrogen storage. What is further desired is a fuel cell system that reduces or eliminates carbon dioxide generation in the fuel cell, and is capable of being reversed to regenerate the reactant fuel.

SUMMARY OF THE INVENTION

The present invention addresses the aforementioned needs in the art, as will now be summarized and further described in detail herein.

In some variations, this invention provides a fuel cell comprising: (a) an anode layer including an anode catalyst configured for partial oxidation of a reactant; (b) a cathode layer including a cathode catalyst configured for reduction of an oxidant (e.g., oxygen); and (c) a proton-exchange membrane in communication with the anode layer and the cathode layer.

The fuel cell can, in some embodiments, further include a first input for said reactant and a first output for a partial-oxidation derivative of said reactant, wherein said first input and said first output are in communication with said anode layer; and a second input for said oxidant and a second output for an oxidation product of said oxidant, wherein said second input and said second output are in communication with said cathode layer.

In preferred embodiments, the fuel cell is configured to produce carbon dioxide with a carbon-atom selectivity of less than about 2% from the reactant. In some embodiments, the fuel cell is configured to produce carbon dioxide with a carbon-atom selectivity of less than about 0.5%, preferably less than about 0.1%, and more preferably essentially no selectivity to $CO_2$.

In preferred embodiments, the fuel cell is configured to produce carbon monoxide with a carbon-atom selectivity of less than about 10% from the reactant. In some embodiments, the fuel cell is configured to produce carbon monoxide with a carbon-atom selectivity of less than about 5%, preferably less than about 1%, and more preferably essentially no selectivity to CO.

In some embodiments, the reactant is an oxygenate, such as an alcohol. Exemplary alcohols include ethanol, isopropanol, and 1,3-propanediol.

In some embodiments, the reactant is a heterocyclic compound. Exemplary heterocyclic compounds include those selected from the group consisting of N-methylhydrocarbazole, N-ethylhydrocarbazole, carbazole, pyrene, dibenzofuran, N-methylindole, 1-ethyl-2-methylindole, N-methylcarbazole, and N-propylcarbazole.

Other variations of this invention disclose a $CO_2$-emission-free fuel cell capable of generating electricity from a carbon-containing reactant with essentially no carbon dioxide production. $CO_2$-emission-free fuel cells can include (a) an anode layer including an anode catalyst configured for partial oxidation of the reactant, wherein the partial oxidation produces essentially no carbon dioxide from the reactant; (b) a cathode layer including a cathode catalyst configured for reduction of an oxidant; and (c) a proton-exchange membrane in communication with the anode layer and the cathode layer. In step (a), the partial oxidation preferably produces essentially no carbon monoxide.

Further variations of the invention disclose a regenerative fuel cell comprising: (a) an anode layer including an anode catalyst configured for partial oxidation of a reactant; (b) a cathode layer including a cathode catalyst configured for reduction of an oxidant; (c) a proton-exchange membrane in communication with the anode layer and the cathode layer; and (d) means for regenerating the reactant from at least a portion of the partial-oxidation derivative. The fuel cell is preferably capable of a plurality of regeneration cycles. The fuel cell can include a container or compartment for retaining the partial-oxidation derivative.

In preferred embodiments of regenerative fuel cells, the partial oxidation produces essentially no carbon monoxide or carbon dioxide from the reactant.

The means for regenerating the reactant can comprise supplying electricity to the anode layer and the cathode layer. The means for regenerating the reactant can comprise a converting agent, such as a reducing agent, in some embodiments. Regeneration of the reactant can be conducted in situ or ex situ. Regenerating can emit oxygen; in some embodiments, regenerating emits (into the gas phase) essentially only oxygen.

The present invention also relates to hydrogen storage. In some variations, the invention provides a hydrogen storage system comprising a carbon-containing reactant, a catalyst configured for partially oxidizing the reactant to produce hydrogen and a partial-oxidation derivative, and means for regenerating the reactant from the partial-oxidation derivative. Preferred systems are capable of a plurality of regeneration cycles.

In preferred embodiments, the system is configured to produce carbon dioxide with a carbon-atom selectivity of less than about 2% from the reactant. In some embodiments, the system is configured to produce carbon dioxide with a carbon-atom selectivity of less than about 0.5%, preferably less than about 0.1%, and more preferably essentially no selectivity to carbon dioxide.

In preferred embodiments, the system is configured to produce carbon monoxide with a carbon-atom selectivity of less than about 10% from the reactant. In some embodiments, the system is configured to produce carbon monoxide with a carbon-atom selectivity of less than about 5%, preferably less than about 1%, and more preferably essentially no selectivity to carbon monoxide.

In some embodiments, the reactant is an oxygenate, such as an alcohol. Exemplary alcohols include ethanol, isopropanol, and 1,3-propanediol. In some embodiments, the reactant is a heterocyclic compound. Exemplary heterocyclic compounds include those selected from the group consisting of N-methylhydrocarbazole, N-ethylhydrocarbazole, carbazole, pyrene, dibenzofuran, N-methylindole, 1-ethyl-2-methylindole, N-methylcarbazole, and N-propylcarbazole.

The means for regenerating the reactant comprises supplying electricity and/or a converting (e.g., reducing) agent, in various embodiments. The means for regenerating the reactant can be provided in situ and/or ex situ.

The hydrogen-storage system can include (a) an anode layer including the catalyst configured for the partial oxidation of the reactant; (b) a cathode layer including a cathode catalyst configured for reduction of an oxidant (e.g., oxygen); and (c) a proton-exchange membrane in communication with the anode layer and the cathode layer.

In some systems, the means for regenerating the reactant emits oxygen. The regenerating emits essentially only oxygen, in some embodiments. A portion of the oxygen that is emitted can be reused as the oxidant.

The present invention also provides methods of carrying out electricity generation, hydrogen storage, or fuel cell operation.

In some variations, a method of generating electricity comprises the steps of:

(a) receiving a fuel;

(b) partially oxidizing the fuel with an anode comprising a first catalyst to release a partial-oxidation derivative, protons, and electrons;

(c) absorbing the protons in an electrolyte; and (d) supplying the electrons to a cathode comprising a second catalyst, thereby generating electricity.

Preferred methods produce carbon dioxide with a carbon-atom selectivity of less than about 2% from the reactant. In some embodiments, the method produces carbon dioxide with a carbon-atom selectivity of less than about 0.5%, preferably less than about 0.1%, and more preferably essentially no selectivity to carbon dioxide.

Preferred methods produce carbon monoxide with a carbon-atom selectivity of less than about 10% from the reactant. In some embodiments, the method produces carbon monoxide with a carbon-atom selectivity of less than about 5%, preferably less than about 1%, and more preferably essentially no selectivity to carbon monoxide.

In some method embodiments, the reactant is an oxygenate, such as an alcohol. Exemplary alcohols include ethanol, isopropanol, and 1,3-propanediol. The reactant can also be a heterocyclic compound. Exemplary heterocyclic compounds include those selected from the group consisting of N-methylhydrocarbazole, N-ethylhydrocarbazole, carbazole, pyrene, dibenzofuran, N-methylindole, 1-ethyl-2-methylindole, N-methylcarbazole, and N-propylcarbazole.

Some methods further comprise the step of retaining the partial-oxidation derivative. Some methods further comprise the step of replenishing the fuel by reducing at least some of the partial-oxidation derivative. In some embodiments, the step of replenishing the fuel includes applying an effective voltage to the anode and the cathode.

BRIEF DESCRIPTION OF THE DRAWINGS

FIG. 2 is a schematic representation of the regeneration (reduction) of the oxidized alcohol or oxidized hydrogenated heterocyclic compound product (40) in a fuel cell using electricity (49) to reverse the reaction to produce regenerated fuel (42), according to some embodiments.

DETAILED DESCRIPTION OF EMBODIMENTS OF THE INVENTION

The systems and methods of the present invention will now be described in detail by reference to various non-limiting embodiments of the invention.

Unless otherwise indicated, all numbers expressing dimensions, temperatures, and so forth used in the specification and claims are to be understood as being modified in all instances by the term "about." Without limiting the application of the doctrine of equivalents to the scope of the claims, each numerical parameter should at least be construed in light of the number of reported significant digits and by applying ordinary rounding techniques.

The present invention provides a method and apparatus that employs partial oxidation of a reactant, such as a hydrocarbon or an oxygenate, as a means to extract hydrogen and generate electricity in a fuel cell. In some variations, products from such partial oxidation are subsequently converted back to the starting fuel or to another effective reactant. Preferred embodiments provide a low-emission regenerative fuel cell system. The present invention also provides a method and apparatus for storing hydrogen for any use, such as (but not limited to) energy generation in a fuel cell.

By "partial oxidation" (or "partial reforming") as used in the present description, it is meant that at least one proton and one electron are extracted from the starting hydrocarbon or oxygenate, while substantially no carbon monoxide (CO) or carbon dioxide ($CO_2$) are produced. Partial oxidation produces less hydrogen than complete oxidation of a starting reactant, but complete oxidation stoichiometrically converts all carbon to $CO_2$. Partial oxidation, as used herein, also produces less hydrogen than complete reforming of a starting reactant, which stoichiometrically converts all carbon to CO.

Certain preferred embodiments of the present invention will now be described in more detail, including reference to the accompanying figures. The figures provide representative illustration of the invention and are not limiting in their content. It will be understood by one of ordinary skill in the art that the scope of the invention extends beyond the specific embodiments depicted. This invention also incorporates routine experimentation and optimization of the methods, apparatus, and systems described herein.

Figure 1A:
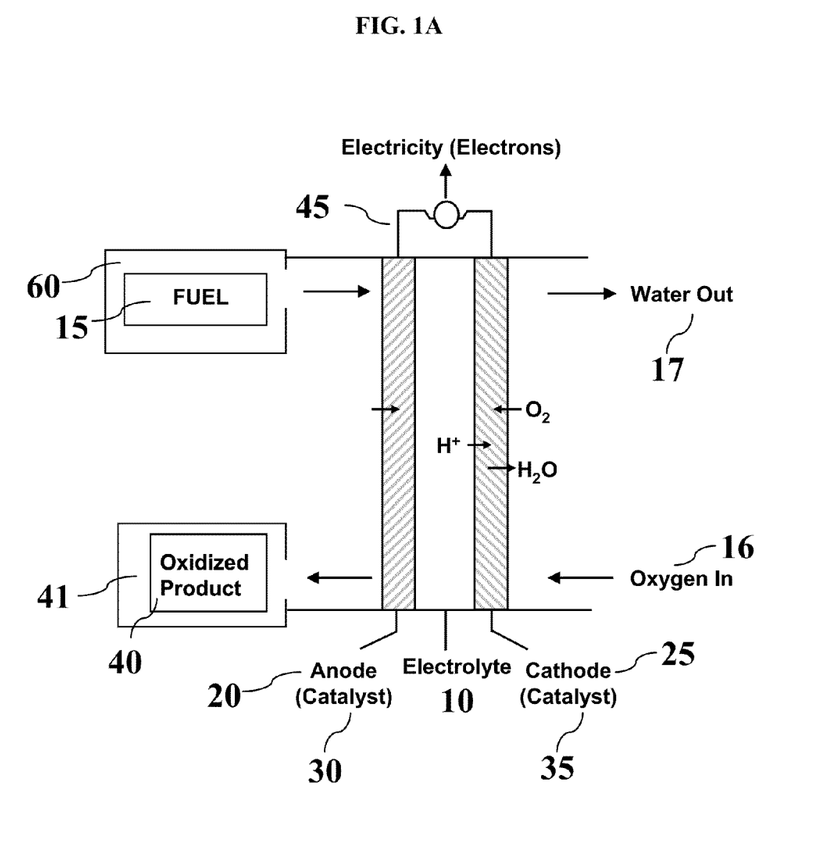
FIG. 1A is a schematic representation of a fuel cell using partial oxidation of alcohol or hydrogenated heterocyclic compound (15), according to some variations of the invention.

The partial oxidation of a reactant fuel in a fuel cell, according to some variations, is diagrammed in FIG. 1A. A reactant fuel 15 is provided to the fuel cell such that it can react at the anode 20 with the anode catalyst 30. Subsequent to the reaction of the fuel 15 with the anode catalyst 30, one or more protons ($H^+$) and one or more electrons ($e^-$) are released. An electrolyte 10, which is preferably proton-absorbing and electron-insulating, subsequently absorbs and conducts the protons through to the cathode catalyst 35, while the electrons generate electricity through an external circuit 45. At the cathode catalyst 35, oxygen molecules 16 are supplied to react with the electrons which have traveled through the external circuit 45. At the cathode 25, protons from the electrolyte form water 17.

Figure 1B:
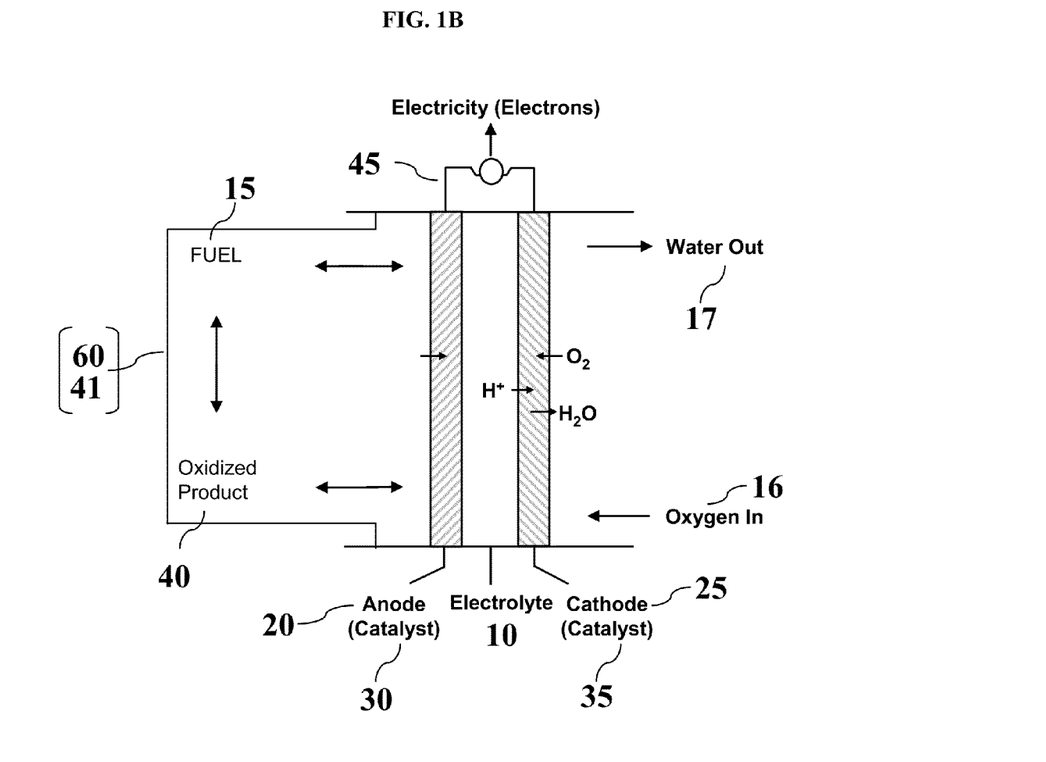
FIG. 1B is a schematic representation of a fuel cell using partial oxidation of alcohol or hydrogenated heterocyclic compound (15), according to some variations of the invention.

In some embodiments, the fuel cell as disclosed herein produces electricity from the supply of a fuel 15 presented on the anode side 20 of the fuel cell apparatus and oxygen 16 oxidant on the cathode side 25 in the presence of the electrolyte 10, as shown in FIGS. 1A and 1B. The reactant fuel 15 flows into the fuel cell, and oxidized products 40 flow to an oxidized product container 41.

The anode 20 comprises an anode catalyst 30 that reacts with and results in the partial oxidation of the reactant fuel 15. An anode catalyst 30 according to some embodiments is one selected from platinum (Pt), platinum-tin (Pt—Sn), and/or platinum-ruthenium (Pt—Ru), any of which can be supported (e.g., on carbon) or unsupported. The anode catalyst 30 can include other platinum-group metals, such as palladium or rhodium, and can be present in free or combined form, such as in metal alloys, oxides, carbides, etc.

In some embodiments, the anode 20 contains a sulfonated fluoropolymer proton conductor, such as Nafion® which is known to possess good thermal and mechanical stability. Nafion's ionic properties result from incorporating perfluorovinyl ether groups terminated with sulfonate groups onto a tetrafluoroethylene backbone.

The electrolyte 10 is a semipermeable membrane generally made from ionomers and designed to conduct protons while being impermeable to gases such as oxygen or hydrogen. The electrolyte 10 can be made from either pure polymer membranes or from composite membranes where other materials are embedded in a polymer matrix. Nafion is an example of an electrolyte 10. Other structures that can be used to make ionomers for the electrolyte 10 include polyaromatic polymers and partially fluorinated polymers. It is preferred to keep the electrolyte 10 hydrated, to maintain proton conductivity.

In some embodiments, the cathode 25 is a layer comprising a mixture of Nafion and a catalyst 35 such as, but by no means limited to, Pt, Pt—Sn or Pt—Ru (optionally supported on carbon). The cathode catalyst 35 can include other platinum-group metals, such as palladium or rhodium, and can be present in free or combined form, such as in metal alloys, oxides, carbides, etc. In certain embodiments, a cathode catalyst 35 is prepared by electrochemical reduction as disclosed in Gonzalez et al., *J. Phys. Chem. S.* 102, 1998, 9881-9890, which publication is hereby incorporated in its entirety by reference.

Generally, the reactant 15 can be any hydrocarbon or oxygenate capable of undergoing partial oxidation as defined herein. Preferred oxygenates include alcohols, or molecules containing at least one —OH group (other oxygen groups can be present). Preferred hydrocarbons include hydrogenated heterocyclic compounds.

The reactant 15 can be an alcohol, in some variations. An exemplary, non-limiting list of alcohols includes methanol, ethanol, 1-propanol, isopropanol (2-propanol), and 1,3-propanediol. $C_{4+}$ alcohols can be used, in some embodiments. The chain length, number of alcohol groups, number of other functional groups, and molecular weight of the alcohol can vary widely, as will be appreciated by a skilled artisan, with the selection of the alcohol generally dictated by overall economics. Preferably, alcohols are liquid at ambient conditions, which is convenient but which is not necessary for the present invention. Selected alcohols are preferably at least partially miscible with water, although that is not necessary.

In some other variations, the reactant 15 can be a hydrogenated heterocyclic compound. An exemplary, non-limiting list of hydrogenated heterocyclic compounds includes N-methylhydrocarbazole, N-ethylhydrocarbazole, carbazole, pyrene, dibenzofuran, N-methylindole, 1-ethyl-2-methylindole, N-methylcarbazole, and N-propylcarbazole.

Partial oxidation of the reactant 15 produces a "partial-oxidation derivative" 40, which refers to a carbon-containing product of the reaction generating at least one proton and one electron. In various embodiments, the partial-oxidation derivative can be an aldehyde, ketone, carboxylic acid, olefin, or aromatic.

For example, when reactant 15 is an alcohol, the partial-oxidation derivative can be an aldehyde, ketone, or carboxylic acid. To illustrate, when the reactant 15 is ethanol, exemplary partial-oxidation derivatives include acetaldehyde and, more preferably, acetic acid. In some embodiments, both the reactant 15 and the partial-oxidation derivative 40 include alcohol groups, e.g. when less than all of the alcohol groups in the starting reactant (such as a polyol) are oxidized.

In preferred embodiments, total oxidation of carbon contained in reactant 15 is avoided, thereby minimizing carbon dioxide formation. In preferred embodiments, carbon contained in reactant 15 is not reformed to produce carbon monoxide. CO and $CO_2$ are not preferred products in regenerative variations of this invention, because the formation of these carbon oxides is essentially irreversible.

On the basis of the reactant 15, the carbon-atom selectivity to $CO_2$ is generally less than about 2%, preferably less than about 0.5%, and more preferably less than about 0.1%, including no detectable $CO_2$ formation. The carbon-atom selectivity to CO is generally less than about 10%, preferably less than about 5%, and more preferably less than about 1%, or less, including no detectable CO formation.

CO and $CO_2$ formation can be avoided or minimized through experimentation with a given catalyst, such as Pt—Sn. Such experimentation can include varying operating conditions such as temperature, pressure, or catalyst 30 contact time, and/or changing the catalyst 30 configuration (e.g., type of support, surface area, surface roughness, and the like). This type of experimentation can be conducted by a person of ordinary skill in the art.

In some variations, after the oxidation reaction has occurred, the partial-oxidation derivative (oxidized product) 40 is retained within the fuel cell in a container 41 (FIG. 1A). In other variations, the partial-oxidation derivative 40 can be returned and mixed with the starting fuel as shown in FIG. 1B, wherein the fuel container 60 and the oxidized product container 41 are one and the same, and the flow of fuel and oxidized product can be in either direction as shown therein.

Figure 3A:
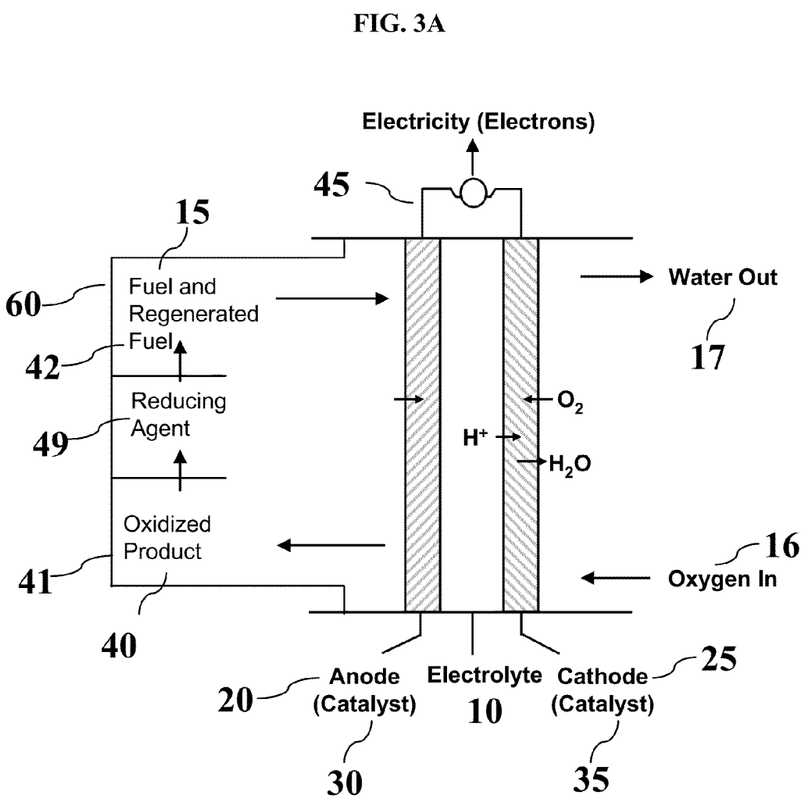
FIG. 3A is a schematic representation of the regeneration (reduction) of the oxidized alcohol or hydrocarbon product (40) to produce regenerated fuel (42) in a fuel cell, using a converting (reducing) agent (49) in situ, according to some embodiments.
Figure 3B:
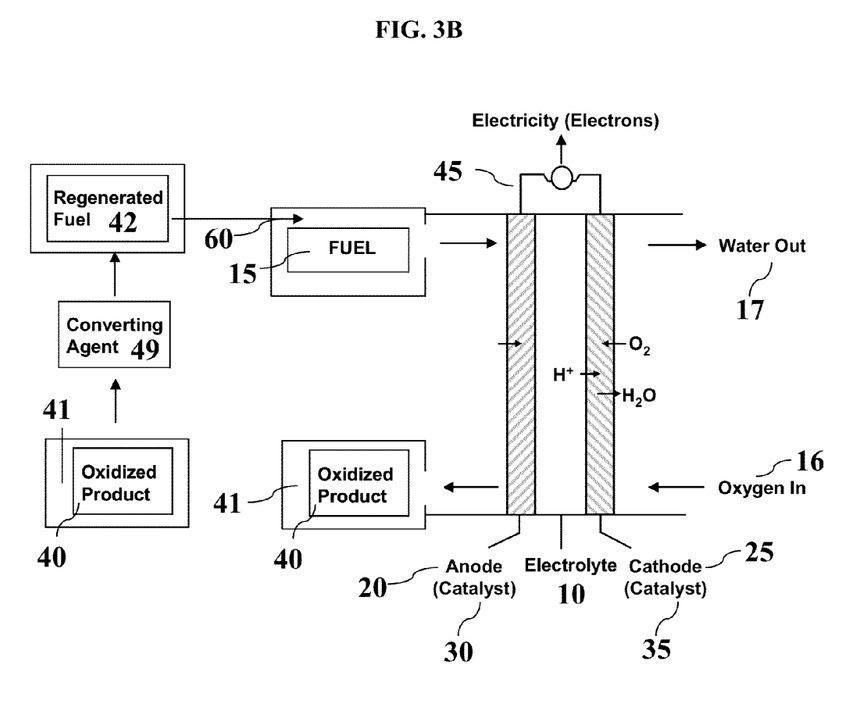
FIG. 3B is a schematic representation of the regeneration (reduction) of the oxidized alcohol or hydrocarbon product (40) to produce regenerated fuel (42) in a fuel cell, using a converting (reducing) agent (49) ex situ, according to some embodiments.

In some embodiments, the retained partial-oxidation derivative 40 can be regenerated to produce a regenerated fuel 42 by means of electricity 48 (as depicted in FIG. 2) or by means of a converting agent 49 (e.g., a reducing agent), as depicted in exemplary FIGS. 3A and 3B. This regenerative conversion allows for the fuel cell to recycle, i.e. it can be substantially rechargeable.

Some variations of the invention provide a convenient means for hydrogen storage. Partial oxidation of a reactant releases hydrogen (protons) which can be supplied to a variety of systems or reactions. The partial oxidation of ethanol with water to produce acetic acid and four protons, for example, represents a hydrogen capacity of 6.25 wt %. This capacity is competitive with Mg on a gravimetric basis and would be sufficient for some transportation applications. The standard enthalpy change for ethanol partial oxidation with water is 39 kJ/mol (endothermic reforming), which is considerably less than that of Mg (approximately 75 kJ/mol). A lower enthalpy change means that the equilibrium pressure of $H_2$ is higher, for a given temperature. A selective catalyst, such as Pt—Sn on carbon, can partially reform ethanol to acetic acid, preferably without further reaction leading to the production of CO or $CO_2$. Both the ethanol/water reactant mixture and the product, acetic acid, are liquids near 25° C. Therefore, the fuel mixture and the partial-oxidation product may be pumped into and removed from the point of use readily, using standard methods known in the art for hydrocarbon fuels.

Many variations of such hydrogen-storage systems are contemplated. In some embodiments, 1,3-propanediol can be used as the hydrogen carrier. The partial-oxidation derivative that is produced along with protons is malonic acid, representing a system capable of carrying and supplying over 7 wt % hydrogen.

EXAMPLE 1

In this example, a mixture of ethanol and water is provided to a fuel cell of the invention, at about a 1:1 molar ratio of ethanol to water. The following net partial-oxidation reaction is carried out at the anode, catalyzed (at least in part) by the anode catalyst:

$$CH_3CH_2OH + H_2O \rightarrow CH_3COOH + 4H^+ + 4e^-$$

In this reaction, one mole of ethanol and one mole of water generate four moles of protons and four moles of electrons, in conjunction with one mole of the partial-oxidation derivative acetic acid. This system has a hydrogen storage capacity of about 4/(46+18)=6.25 wt % (46 and 18 are the molecular weights of ethanol and water, respectively). The anode catalyst comprises Pt—Sn. The cathode catalyst comprises Pt on carbon.

EXAMPLE 2

In this example, a mixture of 1,3-propanediol and water is provided to a fuel cell of the invention, at about a 1:2 molar ratio of 1,3-propanediol to water. The following net partial-oxidation reaction is carried out at the anode, catalyzed (at least in part) by the anode catalyst:

$$HOCH_2CH_2CH_2OH + 2H_2O \rightarrow HOOCCH_2COOH + 8H^+ + 8e^-$$

This reaction, which produces malonic acid as a partial-oxidation derivative, stoichiometrically generates eight protons and has a hydrogen storage capacity of 8/112=7.14 wt %. The anode and cathode catalysts each include Pt.

The reactions of Examples 1 and 2 above provide direct fuels with hydrogen content that is comparable to hydrogen fuel cells presently available. Thus, fuel cells based on ethanol and 1,3-propanediol have overall energy densities that are comparable to systems composed of hydrogen fuel cells and hydrogen-storage materials that can carry 6-7% weight of hydrogen.

The regeneration of the ethanol and 1,3-propanediol reactants from the respective acetic acid and malonic acid derivatives produced in Examples 1 and 2, can be carried out by electrical 48 means, wherein electricity is supplied to carry out the reverse reactions. The conversion reaction can occur inside (in situ) the fuel cell (e.g., as shown in FIG. 2) or ex situ in a separate electrolyzer (not shown). Electrochemical reactions are discussed in Lund and Baizer, "Organic Electrochemistry," page 484 (Marcel Dekker, Inc. 1991), the relevant contents of which are hereby incorporated by reference herein.

Alternatively, the acetic acid and malonic acid produced, respectively, in Example 1 (ethanol) and Example 2 (1,3-propanediol) above can be converted back to alcohols using a reducing agent 49. The conversion of the partially oxidized products 40 back to alcohols 15 can be performed inside (in situ) the fuel cell (FIG. 3A) using a converting (reducing) agent 49; or outside (ex situ) the fuel cell as shown in FIG. 3B, using a converting (reducing) agent 49.

Lithium aluminum hydride, diborane, sodium aluminum hydride and lithium borohydride are non-limiting examples of chemical reducing agents 49 that could be employed. A general conversion reaction of a partially oxidized fuel using lithium aluminum hydride to produce a regenerated fuel 42, is shown below (where R is a carbon chain optionally containing oxygen):

EXAMPLE 3

In this example, isopropanol (2-propanol) is provided to a fuel cell of the invention. The following net partial-oxidation reaction is carried out at the anode, catalyzed (at least in part) by the anode catalyst:

$$CH_3CHOHCH_3 \rightarrow CH_3COCH_3 + 2H^+ + 2e^-$$

This partial-oxidation reaction does not consume water. Isopropanol generates two protons, two electrons, and acetone in accordance with this reaction. The associated hydrogen storage capacity of isopropanol, using this chemistry, is 2/61=3.28%. It is known to a person skilled in the art that this reaction is electrochemically reversible. Acetone can be converted to isopropanol when the current flow of the fuel cell is reversed, as shown in FIG. 2. On the cathode side, water is split into oxygen and protons which cross the membrane and recombine with acetone to produce isopropanol. The maximum energy storage capacity for the isopropanol-acetone reaction is calculated to be about 879 mAh/g. The anode and cathode catalysts each include Pt supported on carbon, in this Example 3.

EXAMPLE 4

Figure 4:
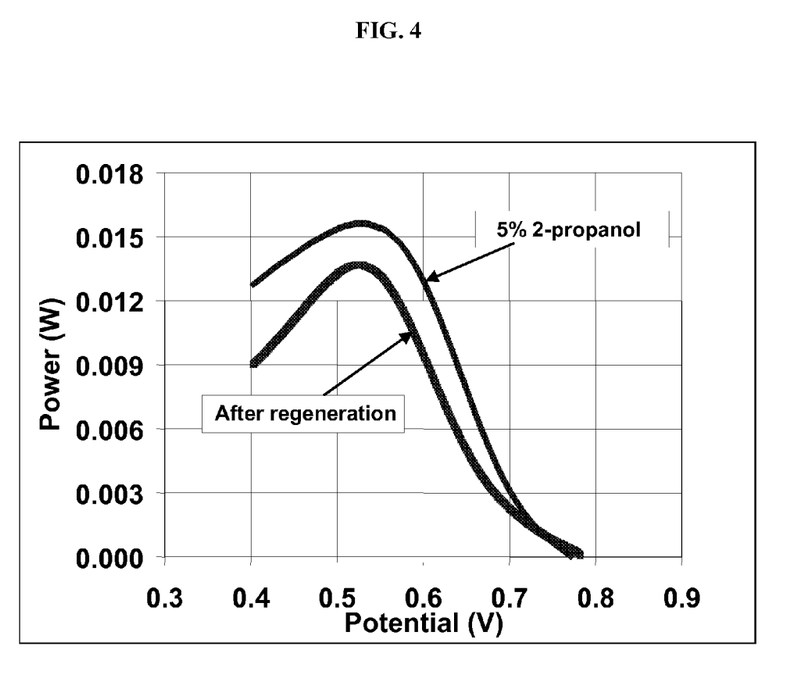
FIG. 4 is a power-potential plot for a fuel cell according to the present invention, comparing operation using fresh 2-propanol with using 2-propanol that has been regenerated from its partial-oxidation product, acetone, by electrolyzing the acetone at 1.6 volts to produce a regenerated 2-propanol fuel.

This example demonstrates the regenerative operation of a direct isopropanol fuel cell. A fuel cell utilizes isopropanol 15, a single-membrane electrode 10 assembly with Pt—Ru on carbon as the anode catalyst 30 and Pt on carbon as the cathode catalyst 35. The electrode surface area is about 4 cm². Three milliliters of 5% acetone in water solution is circulated through the fuel cell. A potential of 1.6 volts 48 is applied to the fuel cell until 250 coulombs of charge pass (FIG. 2). After the fuel cell rests for approximately 30 seconds to allow for a stable open-circuit voltage to be established, a linear potential scan from the open-circuit voltage to 0.4 volts is performed at a scan rate of 1 mV/s. FIG. 4 is a power-potential plot for a fuel cell according to this Example 4, comparing operation using fresh 2-propanol with using 2-propanol that has been regenerated from its partial-oxidation product, acetone, by electrolyzing the acetone at 1.6 volts to produce a regenerated 2-propanol fuel.

EXAMPLE 5

An experiment is carried out in a similar manner to Example 4. After the acetone is charged at 1.6 volts, a liquid sample is removed and analyzed by gas chromatography. Complete quantitative conversion to isopropanol is confirmed.

EXAMPLE 6

This example demonstrates an embodiment of the invention utilizing a non-alcohol reactant, namely, N-ethyl hydrocarbazole which is a hydrogenated heterocyclic molecule. This reactant can be partially oxidized according to the following reaction:

This reaction represents a hydrogen storage capacity of 5.8 wt % for the pure N-ethyl hydrocarbazole. In the presence of a 5 w % Pt—Ru/C catalyst 30, the above reaction can take place at temperatures as low as 130° C. Due to favorable thermodynamics, a fuel cell using this partial-oxidation reaction delivers high voltage and efficiency.

Practical applications for this invention include, but are not limited to, small power plants, electric and hybrid vehicles, auxiliary power, off-grid power supply, notebook computers, and portable electronics. Many space and military applications (e.g., satellites) can also be realized. Other applications for this invention relate to hydrogen storage, transportation, and refueling.

Chemical regeneration, as described here, provides for a feasible fueling infrastructure due to the use of liquid fuels. For example, when a fuel cell of the present invention is used in an automotive application, the spent fuel (e.g., an acid) can be pumped out of the fuel cell system which can then be replenished with the reactant fuel (e.g., an alcohol). The spent fuel can be converted to the starting fuel in a chemical reactor, which could be located, for example, at a fueling station.

In this detailed description, reference has been made to multiple embodiments and to the accompanying drawings in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein.

The embodiments, variations, equations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

The invention claimed is:

1. A fuel cell comprising:
   (a) a carbon-containing heterocyclic-compound reactant fuel contained within said fuel cell, wherein said heterocyclic-compound reactant fuel contains (i) carbon and (ii) oxygen and/or nitrogen as ring members;
   (b) an anode layer including an anode catalyst for partial oxidation of said reactant;
   (c) a cathode layer including a cathode catalyst for reduction of an oxidant; and
   (d) a proton-exchange membrane in communication with said anode layer and said cathode layer.

2. The fuel cell of claim 1, wherein said anode catalyst is selected for its capability to produce carbon dioxide with a carbon-atom selectivity of less than about 2% from said reactant.

3. The fuel cell of claim 2, wherein said anode catalyst is selected for its capability to produce carbon dioxide with a carbon-atom selectivity of less than about 0.5% from said reactant.

4. The fuel cell of claim 3, wherein said anode catalyst is selected for its capability to produce carbon dioxide with a carbon-atom selectivity of less than about 0.1% from said reactant.

5. The fuel cell of claim 4, wherein said anode catalyst is selected for its capability to produce no carbon dioxide from said reactant.

6. The fuel cell of claim 1, wherein said anode catalyst is selected for its capability to produce carbon monoxide with a carbon-atom selectivity of less than about 10% from said reactant.

7. The fuel cell of claim 6, wherein said anode catalyst is selected for its capability to produce carbon monoxide with a carbon-atom selectivity of less than about 5% from said reactant.

8. The fuel cell of claim 7, wherein said anode catalyst is selected for its capability to produce carbon monoxide with a carbon-atom selectivity of less than about 1% from said reactant.

9. The fuel cell of claim 8, wherein said anode catalyst is selected for its capability to produce no carbon monoxide from said reactant.

10. The fuel cell of claim 1, wherein said anode catalyst is in supported or unsupported form and is selected from the group consisting of platinum, platinum-tin, platinum-ruthenium, platinum-palladium, platinum-rhodium, and combinations, alloys, oxides, or carbides thereof; and wherein said cathode catalyst is in supported or unsupported form and is selected from the group consisting of platinum, platinum-tin, platinum-ruthenium, platinum-palladium, platinum-rhodium, and combinations, alloys, oxides, or carbides thereof.

11. The fuel cell of claim 1, wherein said fuel cell further contains said oxidant, wherein said oxidant is oxygen.

12. A $CO_2$-emission-free fuel cell capable of generating electricity from a carbon-containing heterocyclic reactant, wherein said fuel cell comprises:
   (a) a carbon-containing heterocyclic reactant fuel contained within said fuel cell, wherein said heterocyclic-compound reactant fuel contains (i) carbon and (ii) oxygen and/or nitrogen as ring members;
   (b) an oxidant contained within said fuel cell;
   (c) an anode layer including an anode catalyst for partial oxidation of said reactant, wherein said anode catalyst is selected for its capability to produce no carbon dioxide from said reactant;
   (d) a cathode layer including a cathode catalyst for reduction of said oxidant; and
   (e) a proton-exchange membrane in communication with said anode layer and said cathode layer.

13. The fuel cell of claim 12, wherein said anode catalyst is selected for its capability to produce no carbon monoxide from said reactant.

14. The fuel cell of claim 12, wherein said anode catalyst is in supported or unsupported form and is selected from the group consisting of platinum, platinum-tin, platinum-ruthenium, platinum-palladium, platinum-rhodium, and combinations, alloys, oxides, or carbides thereof; and wherein said cathode catalyst is in supported or unsupported form and is selected from the group consisting of platinum, platinum-tin, platinum-ruthenium, platinum-palladium, platinum-rhodium, and combinations, alloys, oxides, or carbides thereof.

15. A regenerative fuel cell comprising:
   (a) a carbon-containing heterocyclic-compound reactant fuel contained within said regenerative fuel cell, wherein said heterocyclic-compound reactant fuel contains (i) carbon and (ii) oxygen and/or nitrogen as ring members;
   (b) an anode layer including an anode catalyst for partial oxidation of said reactant, to produce a partial-oxidation derivative;
   (c) a cathode layer including a cathode catalyst for reduction of an oxidant;
   (d) a proton-exchange membrane in communication with said anode layer and said cathode layer;
   (e) means for regenerating said reactant from at least a portion of said partial-oxidation derivative.

16. The fuel cell of claim 15, wherein said means for regenerating said reactant comprises supplying electricity to said anode layer and said cathode layer.

17. The fuel cell of claim 15, wherein said means for regenerating said reactant is provided in situ.

18. The fuel cell of claim 15, wherein said fuel cell is capable of a plurality of regeneration cycles.

19. The fuel cell of claim 15, wherein said anode catalyst is selected for its capability to produce no carbon dioxide from said reactant.

20. The fuel cell of claim 19, wherein said anode catalyst is selected for its capability to produce no carbon monoxide from said reactant.

21. The fuel cell of claim 15, wherein said regenerating emits oxygen.

22. The fuel cell of claim 21, wherein said regenerating emits only oxygen.

* * * * *